J. J. ZOFSAK.
WASHING MACHINE.
APPLICATION FILED NOV. 18, 1916. RENEWED FEB. 10, 1920.
1,353,302.
Patented Sept. 21, 1920.
2 SHEETS—SHEET 2.
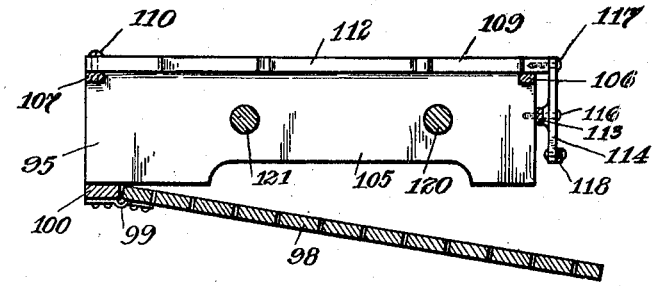
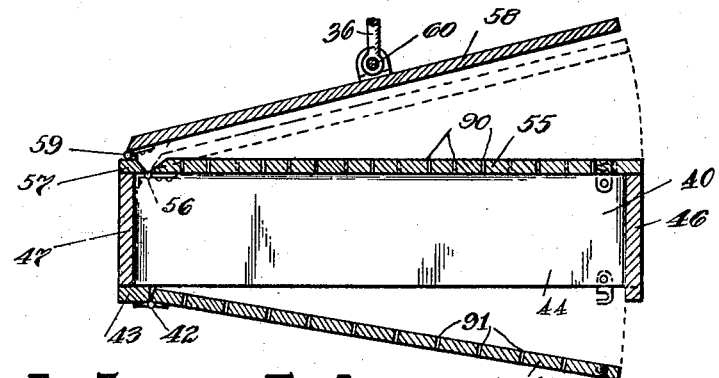
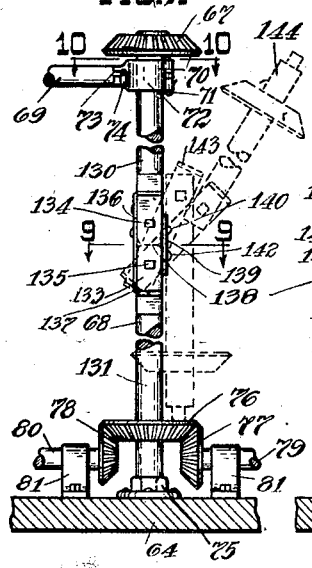 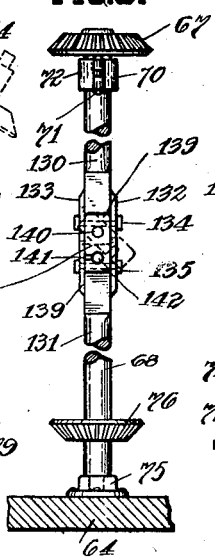 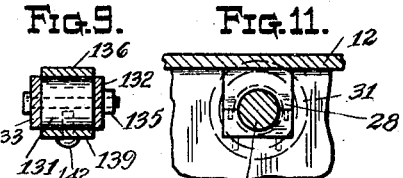
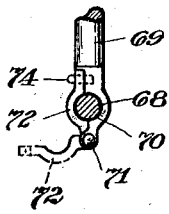
INVENTOR.
JOHN J. ZOFSAK.
BY *William A. Hirtle,*
ATTORNEY

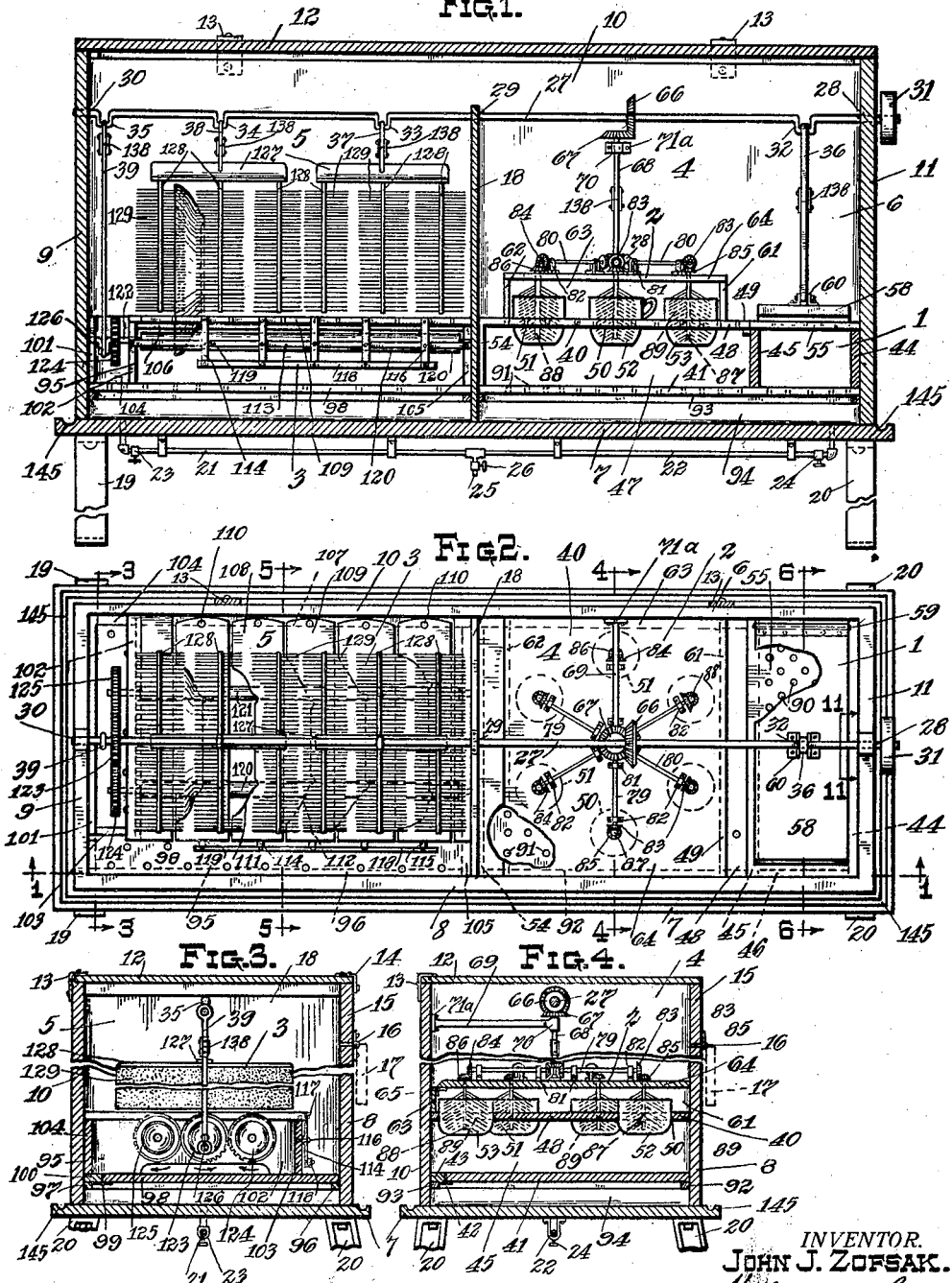

UNITED STATES PATENT OFFICE.

JOHN J. ZOFSAK, OF GREENSBURG, PENNSYLVANIA.

WASHING-MACHINE.

1,353,302.                    Specification of Letters Patent.      Patented Sept. 21, 1920.

Application filed November 18, 1916, Serial No. 132,182. Renewed February 10, 1920. Serial No. 357,748.

*To all whom it may concern:*

Be it known that I, JOHN J. ZOFSAK, a subject of the Emperor of Austria-Hungary, residing at Greensburg, in the county of Westmoreland and State of Pennsylvania, have invented certain new and useful Improvements in Washing-Machines, of which the following is a specification.

The present invention relates to a machine for washing dishes, knives, forks, and the like, having novel and improved means for accomplishing this object.

A receptacle having therein a number of rotating and reciprocating brushes, and a plunger adapted to create suction as well as other means are used to accomplish the desired purpose.

The device is constructed so that it may be readily cleaned after use, and adapted to be operated by a water motor or other readily available means of power, and provided with its own supports for convenient household use.

These and other objects and desirable features will be brought out more fully hereinafter in this specification as the description proceeds.

In the accompanying drawings I have shown one complete example of the physical embodiment of my invention constructed according to the best mode I have so far devised for the practical application of the principles of the invention.

Figure 1 is a vertical sectional view of my invention taken on line 1—1 of Fig. 2.

Fig. 2 is a top plan view of the device with the cover of same removed for purposes of illustration.

Fig. 3 is a cross-section taken on line 3—3 of Fig. 2.

Fig. 4 is a cross-section taken on line 4—4 of Fig. 2.

Fig. 5 shows a view in cross-section of a removable part of the invention taken on line 5—5 of Fig. 2.

Fig. 6 is a similar cross-section taken on line 6—6 of Fig. 2.

Fig. 7 is an enlarged detail side view of one of the vertical shafts illustrating a special form of construction used.

Fig. 8 is a front view of same.

Fig. 9 is a cross-section on line 9—9 of Fig. 7.

Fig. 10 is a cross-section on line 10—10 of Fig. 7.

Fig. 11 is a partial vertical view of a portion of the device taken on line 11—11 of Fig. 2.

For convenience of description I will designate the three mechanisms which together form the complete washing machine as follows. The knife washing mechanism 1, and in which the knives, forks, spoons and similar utensils are washed; the cup washing mechanism 2; and the plate washing mechanism 3 in which plates, saucers, bowls, and similar vessels are washed. It will be observed that the knife and cup washing mechanisms are in one compartment 4, while the plates are cleaned in another compartment 5.

The numeral 6 indicates a box or receptacle preferably of wood or similar material having a bottom 7 and side walls 8, 9, 10, 11, and a cover 12 hinged at 13 to the rear wall 10 and adapted to be secured at 14 to the front wall 8. A portion 15 of the front wall is hinged at 16 so that the same may be opened as shown by the dotted position 17. An inner partition wall 18 separates compartments 4, and 5, and the box 6 is supported by legs 19, 20, etc. The box is also provided with drain pipes 21, 22 having connection with compartments 5 and 4 respectively, and control valves 23, 24. Said drainage pipes form a junction and both exhaust into pipe 25, which last is provided with a valve at 26.

A main drive shaft 27 is positioned near the top of the box 6, and approximately in the center thereof. Said drive shaft has bearings at 28, 29, 30, as shown in Fig. 11, of such design as will permit of shaft 27 being entirely removed from the box 6, and a pulley 31 rigidly mounted thereon, preferably without the box 6 as shown. The fixed pulley 31 is adapted to receive power from any suitable source of motive power (not shown). The drive shaft 27 has a number of bent portions 32, 33, 34, 35 which provide points of attachment for a number of connecting rods 36, 37, 38, 39 used to operate various parts of the washing device as will be further explained below. The knife and cup washing compartment 4 has a removable frame 40 consisting of the following parts. A horizontally disposed perforated board 41 hinged at 42 to a longitudinal strip 43, see Figs. 4 and 6, two vertically disposed partitions 44, 45 rigidly attached to two end pieces 46, 47; a horizontally disposed piece 48 rigidly attached to vertical partition 45 at 49, and having a series of openings 50, 51, etc. adapted to receive the ordinary cups 52, 53 and a vertically disposed piece 54 is rigidly attached to the horizontally disposed piece 48. A perforated part 55 is hinged at 56 to part 57, the latter being rigidly attached to end piece 47 as shown in Fig. 6. Part 57 also carries the plunger 58 which is hinged at 59 thereto. Plunger 58 has a pivoted connection at 60 with a removable bolt therein adapted to engage the lower end of connecting rod 36. The frame 40 also is provided with two side pieces 61, 62, and a longitudinal rear piece 63 all rigidly attached to horizontal part 48. A horizontally disposed gear supporting portion 64 is hinged at 65 to longitudinal rear piece 63, and carries a number of shafts with bevel gears thereon, as will be described.

The main drive shaft 27 carries rigidly mounted thereon a bevel gear 66 which meshes with bevel gear 67 carried on the upper end of the vertical shaft 68. The latter shaft 68 is supported near its upper end by a horizontally disposed support 69 having a bearing 70 therein, and attached at 71$^a$ to the rear wall 10 of the box 6 aforesaid. The bearing 70 is constructed as shown in the Figs. 7, 8 and 10. The free end of the support 69 is curved as shown in Fig. 10 and together with the complementary curved part 72, and the hinge 71 forms the bearing 70 in which the vertical shaft 68 revolves. The part 72 is provided with a slot 73, and engages under the revoluble pin 74 mounted in the support 69. It is evident that when the pin 74 is in the position shown in Fig. 7 that the vertical shaft 68 is securely held in the bearing 70, and also that the said shaft 68 may be readily removed from the latter when required. At its lower end shaft 68 is removably seated in a bearing 75 which last is rigidly attached to gear support 64, and shaft 68 carries a bevel gear 76 which meshes into a series of bevel gears 77, 78, etc. on radially disposed shafts 79, 80 etc. The latter shafts 79, 80 etc. are supported in bearings at 81, 82 on gear supporting part 64, and carry the bevel gears 83, 84, etc. which mesh into bevel gears 85, 86 on the upper ends of the vertical brush shafts 87, 88 etc. The shafts or rods 87, 88 it will be observed are rotatably mounted in the gear supporting part 64, and are provided with bristles 89 substantially cylindrical in outline and adapted to approximately fit the interior of an ordinary cup. It is evident that when drive shaft 27 is revolved the motion will be transmitted through the various gears and shafts to the brushes 89, revolving same within the cups supported in the horizontal part 48. It is also apparent that the rotary motion of shaft 27 is changed to reciprocating motion in the connecting rod 36, and that the plunger 58 of the knife mechanism is moved up and down as a result, thereby inducing a suction, through the holes 90, of the perforated part 55, and holes 91 of the perforated part 41, when chamber 4 is partially filled with water as will be further explained hereinafter. The frame 40 rests on longitudinal supports 92, 93 attached to the front and rear walls 8 and 10 of box 6.

It is to be also noted that when connecting rod 36 is disconnected at 60, and vertical shaft 68 disconnected at 70, or otherwise from the bevel gears 77, 78 etc. that frame 40 and accompanying parts can then be entirely removed from the box 6. And it is further observed that the cleansing of frame 40 can be readily accomplished due to the hinged connection of parts used at 42, 56, 59 etc. The purpose of the perforations in horizontally disposed parts 48 and 41 is to permit any of the heavier solids that may be washed from the cups, knives, forks etc. to pass down through same to the bottom portion 94 of chamber 4.

The plate washing mechanism may be described as follows. A removable frame 95 similar to frame 40 is positioned within chamber 5 and supported by longitudinal strips 96, 97 attached to the front and rear walls 8, 10 as shown. Figs. 3 and 5 of the drawings show cross-sectional views of frame 95 and attached parts. 98 is a horizontally disposed and perforated part hinged at 99 to a longitudinal strip 100. Two vertically and transversely disposed pieces 101, 102 are rigidly attached to two pieces 103, 104. The latter piece, 104 being also rigidly connected to longitudinal strip 100 aforesaid. Another transverse piece 105 positioned normally adjacent to division wall 18 is attached to two longitudinal stringers 106, 107, and the latter in turn are attached to transverse piece 102. A series of horizontal transverse pieces 108, 109 etc. pivoted at 110 to stringer 107, and extending beyond the stringer 106 as shown in Fig. 5, are positioned on said stringers and are slidably arranged on stringer 106. Transverse pieces 108 and 109 have openings, 111, 112 etc., adapted to accommodate the cross-section of a plate or saucer, so that it is seen a series of plates, saucers and bowls may be arranged in said openings in 111, 112 etc. Another longitudinal stringer 113 carries a series of vertical bars 114, 115 etc. pivoted at 116 to stringer 113 and also pivoted at 117 to the ends of transverse pieces 108 and 109. A longitudinal rod 118 pivotally connected to vertical bars 114, 115, unifies the action of the latter when rotatably operated about 116. It is noted that when the brushes 129 are operating against the concave sides of the dishes inserted in the openings 111, 112, etc., that the said brushes are in comparatively close contact with their bristles bent against the dishes, though not in such pressing engagement as will prevent the rotation of the latter by the revolving roller shafts 120 and 121. When rod 118 is moved to the left as seen in Fig. 1 of the drawings, the rotation of the vertical bars 114, 115 etc. about 116, in turn causes the transverse pieces 108, 109 etc. to rotate about the point 110, and as a result moves the latter relatively to each other, in a transverse direction with respect to the washing machine itself. Further, as the positions of the brushes 129 are fixed longitudinally on the drive shaft 27, it is seen that when transverse pieces 108, 109 etc. rotate about point 110 the concave faces of the dishes in the openings 111, 112 etc. are moved from their more immediate and intimate engagement with the aforesaid bent bristles of the brushes 129. It is apparent therefore from the above that the two last described movements of the transverse pieces 108, 109 tend to loosen and disengage the dishes from their close operating contact with the bristles of the brushes 129 sufficiently to permit the ready removal of said dishes from between the brushes, and from the washing machine.

When the dishes have been placed in the openings 111, 112 etc. the rod 118 is moved to the right as seen in Fig. 1 of the drawings, and the transverse pieces 108, 109 etc. are then moved to their normal operating positions as is readily understood. Vertical rods 114, 115, etc., can then be locked by means of a short removable locking pin 119, the position of which is shown in Fig. 1, and which is inserted in a socket made therefor in the stringer 113, adjacent to the rod 114, thereby preventing the reverse rotation of the rods 114, 115 about 116.

The vertically and transversely disposed parts 102 and 105 carry two roller shafts 120, 121 rotatably mounted therein, and a short shaft or axle 122 is mounted rotatably in parts 101 and 102. Gears 124, 125, are mounted rigidly on shafts 120, 121 as shown, and each of said gears mesh with gear 123, which last is rigidly mounted on shaft 122. It is seen that when gear 123 is properly actuated that rotary motion is transmitted to and through said gears 124 and 125 to the shafts 120 and 121 respectively. Shaft 122 has a bent portion 126 to which is attached vertical connecting rod 39, which in turn is fastened rotatably to the main drive shaft 27. The plates and saucers rest on the roller shafts 120, 121, and when actuated by drive shaft 27 the plates between the transverse pieces 108, 109 etc., are thereby rotated.

The vertical connecting rods 37, 38, are attached to drive shaft 27 as before mentioned and support a longitudinally positioned frame 127 having transverse brush holders 128 attached thereto, and arranged in parallel relation with each other. The brush holders carry brushes 129 of shape shown in the drawings, and adapted to engage against the faces of the plates in the openings 111, 112, etc., and it is seen that when shaft 27 is operated the brushes 129 will reciprocate vertically, against the plates, and synchronously therewith the plates will be rotated by the roller shafts 120, 121. It is also to be noted that the horizontal part 98 extends transversely the full width of the box 6 between walls 8 and 10 and is perforated for the same reason as perforated parts 41 and 48 in chamber 4, namely to permit flow of water and solids therethrough. When brushes 129, connectings rods 37, 38, 39 are removed as will be explained it is apparent that the frame 95 with all attachments can be removed bodily for cleansing purposes, and also that the hinged connection of parts used facilitates the thorough manual cleaning of the interior of the said frame 95.

In connection with the vertical connecting rods 36, 37, 38, 39 and vertical shaft 68 a specially constructed joint is used, as shown in large detail, in Figs. 7 to 10 inclusive, which shows the vertical shaft 68 of the cup washing mechanism. The shaft 68 is formed of two separate parts 130, 131. The upper portion 130 as before explained being supported by horizontal support 69 in bearing 70, and the lower portion 131 being attached slidably and pivotally to the upper portion 130 by means of two side splice plates 132, 133 and pins 134, 135, which pass through said plates and parts 130 and 131. A plate 136 is rigidly attached to the upper part 130 and projects over the upper end of the lower part 131 at 137, but is not attached to the latter, forming a rear support for the joint 138. On its face the upper part 130 has a slidable plate 139 pivotally connected at 140 to the same, and having a slot 141 therein adapted to slidably engage a pin 142 fixed in part 131. It is seen that when the pivoted plate 139 is parallel with the shaft 68 and the pin 142 in engaged position a rigid joint is made at 138, and also that when plate 139 is reversed the part 131 can then take a number of positions such as shown dotted at 143, in which case bevel gear 76 is disengaged from bevel gears 77, 78 etc., or part 131 can be made to assume the position indicated at 144. The utility of this feature of the shaft 68 is at once apparent in connection with the removal of frame 40 and accompanying parts from box 6. Also the same feature is shown in the drawings applied to each of the connecting rods 36, 37, 38, 39, for the purpose of facilitating the removal of frames 40 and 95. Means is also provided at 126 for detaching connecting rods 39 from shaft 122 for the same purpose. It will also be understood that when shaft 27 is removed entirely from its bearings, by disengaging connecting rod 36 from plunger 58 at 60, and connecting rod 39 from shaft 122, the frames 127 and brushes 129 are removed bodily from the device, and shaft 68 is removed from bearing 70, in which case the specially constructed joint 138 is unnecessary. It may be said the shaft 27 is ordinarily removed for cleaning purposes only, whereas joint 138 permits the cups, knives, plates, etc. to be inserted in the washing machine, and the portion 15 of front wall 8 of the box is hinged at 16 to permit of greater freedom of movement in this connection.

Operation of the device is as follows. The cover 12 is thrown backward, connecting rod 36 and shaft 68 disconnected at their lower extremities broken at the joints 138 in each, and then placed in a reversed position similar to 144 in Fig. 7 as nearly as the circumstances will permit. The portion 15 of the front wall 8 is thrown open, the parts 64, 58, 55, are raised upward and the knives, forks and spoons are placed in the knife washing mechanism 1 and the cups in the openings in horizontal part 48. The plates, bowls, etc. are next placed in openings 111, 112 etc. and between the brushes 129, by operating the bar 118 of the frame 95 as before explained. The connecting rod 36 is now reconnected at 60, and shaft 68 replaced in position in bearing 75, and the device is ready to be partly filled with soap suds and hot water. It is to be noted in this connection that the water level maintained in chamber 4 is preferably lower than in chamber 5 and the division wall 18 is designed to meet this condition. The portion 15, of the front wall 8 is now closed, cover 12 replaced and locked at 14 and power from a water motor (not shown) or other source is applied to pulley 31, and shaft 27 operates the brushes 87 within the cups, plunger 58 reciprocates and by suction washes the knives and forks, while brushes 129 cleanse the plates, roller shafts 120, 121 rotating the plates, during the operation. When thoroughly washed the dishes can be removed as readily as they were inserted in the device, the chambers 4 and 5 drained by pipes 21, 22 and the washing machine is ready for a repetition of the operation when necessary.

The washing machine can be brought into close relation to the ordinary sink, a water motor attached to the faucet, and connected by belt to pulley 31 thereby furnishing the power to operate the device. After use the washing machine can be removed bodily to any convenient place, and the same is furnished with supporting legs 19, 20, etc., for this purpose. Any water that may spill over the top edges of the box 6 is caught by the gutters 145 formed in the bottom 7 of same. From the above description it is seen that I have provided a device of utility for the purpose intended and above set forth.

What I claim is:

1. In a washing machine, an inclosing receptacle, means for supporting and holding a number of dishes in an upright position, a plurality of suspended brush holding frames having brushes thereon, and adapted to reciprocate vertically between the dishes, a drive shaft with a series of offset portions formed therein, rotatably mounted in the walls of the aforesaid receptacle, a number of vertically disposed connecting rods revolubly mounted on the bent offset portions of the drive shaft, and adapted to convert rotary motion of the drive shaft into reciprocating motion in the brush holding frames aforesaid.

2. In a washing machine, in combination, an inclosing receptacle, means for holding and supporting a number of dishes in an upright position, a plurality of suspended brush holding frames adapted to reciprocate vertically, and having brushes thereon, a drive shaft mounted in the receptacle aforesaid, a number of connecting rods mounted on the drive shaft and connected to the said frames, means carried by the connecting rods whereby the brush holding frames, and lower portion of the said rods may be placed in a substantially inverted position facilitating the insertion and removal of the dishes from the aforesaid receptacle.

3. In a washing machine, an inclosing receptacle; means for holding and supporting a number of dishes in an upright position comprising a removable frame, a plurality of transverse dish holders pivotally and slidably arranged on the top of the removable frame, a pair of supporting rollers revolubly mounted in the said frame; a series of vertical brushes adapted to reciprocate in contact with the dishes; and means for operating the vertical brushes from a source of power.

4. In a washing machine, an inclosing receptacle; means for holding and supporting a number of dishes in an upright and parallel relation consisting of a removable frame, a pair of supporting rollers mounted therein, a plurality of transverse dish holders pivotally and slidably arranged on the removable frame, means for unifying the action of the dish holders comprising a series of vertical rods having their upper ends pivotally connected to the ends of the holders, and fulcrumed intermediate their length on the removable frame, a horizontal rod pivotally connected to the lower ends of the vertical rods, means for locking the dish holders in closed position on the said frame; a series of brushes designed to reciprocate vertically between the dishes; and means for operating said brushes from a source of power.

5. In a washing machine, an inclosing receptacle, means for holding a number of dishes in an upright position, means for supporting and rotating said dishes in their relative positions, a plurality of suspended brush holding frames adapted to reciprocate vertically and having brushes thereon, a drive shaft with a series of offset portions formed therein, rotatably mounted in the walls of aforesaid receptacle, a number of vertically disposed connecting rods revolubly mounted on the bent offset portions of the drive shaft, and adapted to convert rotary motion of the drive shaft into reciprocating motion in the brush holding frames, means for transmitting motion from the drive shaft to the dish rotating means, whereby the above mentioned brushes are reciprocated vertically against the surface of the dishes, and the latter are at the same time rotated to complete a cleansing operation.

6. In a washing machine, a water-tight inclosing receptacle, means for holding a number of dishes in parallel relation to each other, means for supporting and rotating said dishes in their relative positions, a plurality of depending brush holding frames with brushes thereon adapted to reciprocate vertically in contact with the dishes, a drive shaft with a bent offset portion formed therein mounted in the walls of the aforesaid receptacle, gears carried by the said dish rotating means, an auxiliary bent shaft mounted in the walls of the dish holding means aforesaid, a gear on the latter shaft adapted to engage the first mentioned gears, and means for transmitting motion from the drive shaft to the auxiliary shaft, and to the reciprocating brush holding frames aforesaid.

7. In a washing machine in combination, an inclosing receptacle, means for holding a number of dishes in an upright position, means for supporting and rotating said dishes in their relative positions, a plurality of suspended brush holding frames adapted to reciprocate vertically, and having brushes thereon, a drive shaft mounted in the receptacle aforesaid, a number of connecting rods mounted on the drive shaft, and attached to the said frames, means carried by the connecting rods whereby the brush holding frames and lower portion of said rods may be placed in a substantially inverted position, facilitating the insertion and removal of dishes and means for transmitting motion from the drive shaft to the dish rotating means whereby a cleansing operation may be performed.

8. In a washing machine in combination, an inclosing receptacle, means for holding a number of dishes in an upright position comprising a removable frame, a plurality of transverse dish holders pivotally and slidably arranged on the top of the removable frame, means for supporting and revolving said dishes carried by the removable frame, a series of vertical brushes adapted to reciprocate in contact with the dishes, means for operating the vertical brushes and the dish rotating mechanism from a source of power.

9. In a washing machine, an inclosing receptacle, means for holding a number of dishes in an upright and parallel relation, consisting of a removable frame, a plurality of transverse dish holders pivotally and slidably arranged on the removable frame, means for unifying the action of the transverse dish holders comprising a series of vertical rods fulcrumed on the said removable frame, said rods being pivotally connected at their upper ends to the dish holders, a horizontal rod pivotally connected to the lower ends of the vertical rods, means for locking the dish holders in closed position on the above mentioned removable frame; a series of brushes designed to reciprocate between the dishes, means for operating said brushes and revolving the dishes.

10. In a washing machine, an inclosing receptacle, means for holding a number of dishes in an upright position, means for supporting and rotating said dishes, a plurality of depending brush holding frames, a cranked drive shaft mounted in said receptacle, means for inverting and reciprocating the brush holding frames comprising a series of jointed connecting rods carried by the drive shaft, a rear and downwardly projecting splice plate rigidly attached to the upper half of said rods, side splice plates pivotally and slidably connected to the two halves of the connecting rods near the joint in the same, a headed projecting pin in the lower half of said rods, a front splice plate pivotally and slidably fastened to the upper half of said rods and having a slot adapted to engage under the said headed pin whereby a rigid joint may be formed when the front splice plate is in locked position; and means for transmitting motion from the drive shaft to the dish rotating means aforesaid.

11. In a washing machine, a means for holding a number of dishes in an upright position, consisting of a removable frame, a plurality of transverse dish holders pivotally and slidably arranged on the top of the removable frame, and having cut out portions adapted to conform with the cross-section of a dish formed therein, means for unifying the action of the dish holders consisting of a series of vertical rods having their upper ends pivotally attached to the ends of the holders, and fulcrumed on the said removable frame, a horizontal rod pivotally connected to the lower ends of the vertical rods, and means for locking the dish holders in closed position to prevent the dislocation of the dishes.

12. In a washing machine, a means for supporting, and holding a number of dishes in an upright position, consisting of a removable frame, a plurality of transverse dish holders pivotally and slidably arranged on the top of the removable frame, means for unifying the action of the dish-holders consisting of a series of vertical rods having their upper ends pivotally attached to the ends of the holders, and fulcrumed on the said removable frame, a horizontal rod pivotally connected to the lower ends of the vertical rods, means for locking the dish holders in closed position, and a number of horizontally disposed rollers connectedly geared together and mounted in the aforesaid removable frame.

In testimony whereof I affix my signature in the presence of two witnesses.

JOHN J. ZOFSAK.

Witnesses:
G. A. PIVIROTTO,
CAROLINE SNOWDEN.